2,941,887
PROCESS FOR IMPROVING YEAST-LEAVENED BAKED PRODUCTS AND COMPOSITIONS THEREFOR

Glenn E. Findley, Rte. 1, Box 1442, and William B. Newsome, 4420 Bordeux, both of Dallas, Tex.

No Drawing. Filed Oct. 7, 1957, Ser. No. 688,399

16 Claims. (Cl. 99—91)

This invention relates to a new process and composition for making improved yeast-leavened baked products, such as bread and other baked goods.

The object of this invention is to provide a new process and compositions for use therein for making yeast-leavened baked products having finer grain and texture, whiter crumb color, improved break and shred, better symmetry and highly improved keeping qualities in terms of softness-retention and freshness.

Another object is the preparation of dough possessing improved properties which facilitate machining, such as mixing, dividing, rounding and molding both in terms of ease of operation and reduction in time required.

Still another object is to provide a dough requiring reduced floor rest time and having increased tolerance to delay in processing after maturation.

Still another object is to make possible the use of dough-making water containing high concentrations of alkaline salts such as sodium carbonate or sodium bicarbonate without adversely affecting the quality of the yeast-leavened baked product.

We have discovered that a large and unexpected improvement both in the properties of yeast-leavened dough and the quality of the baked product is obtained when calcium iodate, Ca bromate or a mixture of the two is incorporated during mixing of the dough after completion of the usual preliminary sponge fermentation stage. We have discovered, furthermore, that to obtain the desired improvement, these calcium salts are best employed in conjunction with or in addition to the usual alkali metal oxidizing salt normally added as a bread improver during the sponge-mixing stage, such as potassium or sodium iodate or bromate. Preferably additional alkali metal oxidizing salt, such as K bromate is added with the Ca bromate or iodate at the dough-mixing stage, although this is not essential if sufficient alkali metal oxidizing salt has been incorporated in the sponge to carry over in appreciable amount to the dough stage.

As referred to here, the sponge stage or step comprises the conventional admixture of a part of the total flour with water, yeast and other desired ingredients including yeast foods and improvers, followed by a fermentation period, usually of 3 to 5 hours, and the final dough-making step in which the remainder of the flour and other desired ingredients are incorporated into the fermented sponge. The ingredients and their proportions can, of course, be varied in conventional fashion, depending on the particular baked product being made.

Substantial improvement is noted when the Ca salts are added in amounts as small as 2 parts per million by weight based on the flour. In general, we prefer to employ about 4 to 12 parts per million although more may be used without adverse effect so long as the total amount of oxidizing salt, including both the Ca and alkali metal salts, incorporated in the sponge and dough does not exceed about 75 parts per million. In most cases, substantially maximum enhancement of desirable properties is obtained with amounts of Ca salt up to about 18 parts per million and further addition, though not objectionable, may not be economically worthwhile.

The preliminary sponge, as aforementioned, can be prepared according to standard or normal operating procedure, namely with the usual amount and type of yeast food, enzymes, bread improvers and the like, including the conventional level of alkali metal oxidizing salt, such as $KBrO_3$, which ordinarily ranges from about 5 to 15 or 20 parts per million based on the flour. If more than the average amount is incorporated in the sponge, further addition at the dough-mixing stage along with the Ca iodate or bromate, can be dispensed with, although we prefer addition of some alkali metal oxidizing salt together with the Ca salt in the latter stage. The amount of alkali metal salt added with the Ca salt is not critical but can vary from about 1 or 2 parts per million to 20 or 25 parts per milion or more, so long as total addition of 75 parts per million of oxidizing salt is not exceeded. In general, we prefer to add at the dough stage amounts of alkali metal salt, such as $KBrO_3$, in amount about one-half to three times the amount of Ca salt, but preferably in approximately equivalent quantity.

We have also found addition of an acid phosphate salt such as monocalcium phosphate or dicalcium phosphate, preferably the latter, together with the Ca salt or mixture of Ca and alkali metal salt, advantageous because of its buffering control to the desired dough pH, which preferably is maintained in the range of about 5.3 to 5.4 in the finished baked bread. Where employed, the amount is not critical and can be varied to particular pH requirements.

The effect of addition of the Ca salt to the dough after completion of the preliminary conventional sponge mixing and fermentation stage is immediately apparent in the improved properties of the dough. The dough is more relaxed, more pliable, softer, drier and less sticky so that mixing is smoother, easier and can be accomplished in 10% or more reduced time. Absorption properties of the dough are not adversely affected. Also of considerable importance is the fact that the dough recovers more quickly after the dough mixing operation.

These superior properties of the dough makes possible stretching without tearing and improvement in the entire machining operation, including mixing, dividing, rounding and molding. The drier, less sticky characteristics substantially reduce the amount of dusting flour normally required.

We have found also that floor rest time can be substantially reduced while tolerance of the dough is increased. In other words the dough, after maturing, retains its desirable characteristics for a longer period of time without overaging, making the baker's schedule more flexible and less likely to have disastrous result if an unavoidable delay in oven introduction occurs.

The baked product is markedly improved in symmetry, break and shred, crust, internal fineness of grain, crumb color and texture as compared with products similarly made, according to conventional procedure including addition during the sponge mixing stage of standard yeast foods, enzymes, bread improvers containing $KBrO_3$ and the like, with the exception that Ca iodate, Ca bromate or a mixture of the two, together with an alkali metal oxidizing salt, is not added to the second dough stage. Crust color, evenness of bake, flavor, aroma and taste are also excellent. Total score for our baked product by standard tests is considerably higher. The closer grained, whiter bread or other baked product retains its softness and fresh qualities for a much longer period than the conventionally prepared product.

Although the reasons for the unique effect of introducing Ca bromate, Ca iodate or a mixture of the two salts into the dough stage mixing in conjunction with the conventional alkali metal oxidizer bread improvers are not presently completely understood, we do know that it is not due merely to its expected oxidizing action since addition of an alkali metal oxidizing salt such as $KBrO_3$ or a mixture of $KBrO_3$ and $KIO_3$ at the dough-mixing stage without the Ca salt results both in a dough and a baked product which is not only inferior to our product but is also inferior to the conventionally made product with no addition of oxidizing salt at the dough stage after preliminary sponge fermentation. This clearly demonstrates that our Ca salt addition at the dough-mixing stage exerts a synergistic or other action which is unique and unexpected.

*Example I*

The following controlled tests were run daily for a period of one month.

Three sponges, A, B, and C, were prepared in identical conventional fashion, each with the following components:

65 lbs. flour
40 lbs. water
3 lbs. shortening
8 oz. yeast food containing 15 p.p.m. $KBrO_3$ on total flour
2 lbs. yeast.

The ingredients were mixed at a temperature of 74° to 82° F. depending on shop conditions and then allowed to ferment for 3 to 5 hours at approximately 80° F.

The fermented sponges were returned to the mixer and each combined with the following ingredients to form the dough:

35 lbs. flour
5 lbs. powdered milk
8 lbs. sugar
2 lbs. salt
25 lbs. water

No other ingredients were added to sponge A, the control.

One to two two gram tablets having the following composition by weight were dissolved in the dough water and added with the other listed ingredients to sponge B:

0.2 gm. $Ca(IO_3)_2$ or $Ca(BrO_3)_2$ or a mixture of both. Equivalent of 4.4 p.p.m. per tablet on flour.
0.2 gm. $KBrO_3$—4.4 p.p.m. on flour.
0.5 g. $CaHPO_4$
0.2 gm. sugar
0.9 gm. edible excipients to aid tabletizing and dispersion in water A conventional yeast food containing the equivalent of 8.8 p.p.m. $KBrO_3$ was added to sponge C together with the other ingredients.

The three doughs, A, B and C, were then processed in standard fashion including mixing, floor rest, dividing, rounding, molding, pan proofing and baking.

The following distinctions were noted in the doughs:

(1) Dough B was softer, drier, less sticky and more pliable than doughs A and C.

(2) Mixing time requirement for dough B was reduced by about 10% as compared with doughs A and C.

(3) Dough B recovered in volume more quickly after mixing than doughs A and C.

(4) Dough B was much more extensible than doughs A and C. When the doughs were passed between two rollers for sheeting before molding, dough B sheeted into a piece 4½ inches longer than dough A and 5 inches longer than dough C. A piece of dough B run partially through the rollers stretched almost to the floor without breaking, whereas doughs A and C broke off short.

(5) Dough B required substantially less dusting flour because of its reduced stickiness than did doughs A and C.

(6) Machining operations throughout were easier with dough B than with doughs A and C.

(7) Floor rest time requirement for dough B was reduced by 10 minutes or more and its tolerance to floor delay was excellent.

The baked breads were given daily standard scoring tests and rated as follows:

| Test and Maximum Score | A | B | C |
| --- | --- | --- | --- |
| Volume (10) | 10 | 10 | 10 |
| Crust Color (8) | 7.5 | 7.5 | 7.2 |
| Symmetry (3) | 2.8 | 3.0 | 2.5 |
| Evenness Bake (3) | 3.0 | 3.0 | 2.8 |
| Break & Shred (3) | 2.5 | 2.8 | 2.3 |
| Crust (3) | 2.5 | 2.8 | 2.4 |
| Internal Grain (10) | 9.0 | 9.5 | 8.5 |
| Color Crumb (10) | 8.9 | 9.5 | 8.5 |
| Texture (15) | 13.5 | 14.0 | 13.2 |
| Flavor-Aroma (15) | 14.0 | 14.0 | 13.5 |
| Taste (20) | 18.0 | 18.0 | 18.0 |
| Total Score | 91.7 | 94.1 | 88.9 |

It is obvious from the standard scoring that bread C with additional $KBrO_3$ only incorporated in the dough mixing stage was inferior in almost all respects to control bread A and that bread B made according to our invention was markedly superior to control bread A in symmetry, break and shred, crust, internal grain, crumb color, texture and in over-all score. Other characteristics, such as crust color, evenness of bake, flavor-aroma and taste, were excellent, as they were also in control bread A.

The closer grained, whiter bread B retains its softness considerably longer than breads A and C, requiring 16 hours to reach the same degree of firmness as bread A and 24 hours to reach the firmness of bread C.

The tests further demonstrated that substantially the same results are obtained with Ca bromate, Ca iodate or mixtures of the two compounds.

The following tests demonstrate the increased resistance to dough fatigue imparted by the calcium salts in combination with the alkali metal salts when added at the dough mixing stage as compared with addition of alkal metal salts alone.

*Example II*

Farinographs were made showing behavior during mixing of the following doughs:

(1) A flour and water sponge containing 2% yeast, 2% salt and 4% shortening was mixed, fermented for 3 hours, admixed with 15 p.p.m. $KBrO_3$ on the flour and 5 p.p.m. $K(IO_3)_2$, given a floor rest time of 30 minutes and mixed again for 10 minutes, the last mixing representing the activity to which the dough is subjected when going through a conventional divider, rounder and molder.

(2) A dough identical to dough 1 was prepared except that 15 p.p.m. $KBrO_3$ and 5 p.p.m. $Ca(IO_3)_2$ were incorporated after sponge fermentation.

Dough 1 fatigued rapidly during the last 10 minute mix, dropping to and below the 200 lines at a rather severe angle of decline after 5 minutes.

Dough 2 containing the Ca salt showed a gentle angle of fatigue, did not reach the 200 line until 8 minutes of the final mixing time had elapsed and fell only slightly below it during the last two minutes.

The water supply in certain areas may be contaminated with alkaline salts such as sodium carbonate and sodium bicarbonate. Such salts act as alkaline buffering agents in the dough water and have an adverse effect on the bread or other baked products because they prevent reduction in pH to the requisite degree of acidity. We have discovered that the addition of the Ca iodate and/or Ca bromate, as aforedescribed, at the dough stage after sponge fermentation remedies such difficulties. The bread develops the desired pH in the range of pH 5.3 to 5.4. The reason for this is somewhat obscure but it may be due to reactions such as the following:

$$Ca(BrO_3)_2 + 2NaHCO_3 \rightarrow Ca(HCO_3)_2 + 2NaBr + 3O_2$$
$$Ca(IO_3)_2 + 2NaHCO_3 \rightarrow Ca(HCO_3)_2 + 2NaI + 3O_2$$
$$Ca(BrO_3)_2 + Na_2CO_3 \rightarrow CaCO_3 + 2NaBr + 3O_2$$
$$Ca(IO_3)_2 + Na_2CO_3 \rightarrow CaCO_3 + 2NaI + 3O_2$$

wherein the alkaline sodium salts are transformed into neutral salts. Improvement in dough properties and baked product characteristics, despite the adverse water conditions, are substantially as described in Example I.

The components of our preferred treating compositions, namely the Ca iodate and/or bromate and alkali metal bromate and/or iodate, with or without the acid phosphate, such as dicalcium phosphate or monocalcium phosphate can be introduced individually, preferably in the dough water to facilitate dispersion in the dough, or they are preferably tabletized or admixed in powder form for ease of use by the individual baker. The latter two methods are preferred since they can be prepared in suitable amounts and proportions together with solid edible diluents for easier measuring and uniform dispersion by the individual user and can be tailored for specific applications. The baker can then readily measure out requisite amounts of the powder or add the requisite number of tablets for the particular batch size or specific type of product.

Although this invention has been described with reference to illustrative embodiments thereof, it will be apparent to those skilled in the art that the principles of this invention can be embodied in other forms but within the scope of the claims.

We claim:

1. In a process for making yeast-leavened baked products which includes the steps of forming a sponge with a portion of the total flour, fermenting the sponge and then making a dough with the remainder of the flour, the improvement comprising admixing with said dough a calcium salt selected from the group consisting of Ca iodate, Ca bromate and mixtures thereof, together with an alkali metal salt selected from the group consisting of iodate, bromate and mixtures thereof, the maximum total amount of said salts added to said product being about 75 parts per million based on the flour, the amount of calcium salt added being about 2 to 18 parts per million based on the flour.

2. The process of claim 1 in which an alkali metal oxidizing salt selected from the group consisting of iodate, bromate and mixtures thereof is one of the sponge-making ingredients.

3. The process of claim 2 in which a phosphate selected from the group consisting of monocalcium phosphate and dicalcium phosphate is admixed with the dough together with the Ca salt and the alkali metal salt.

4. The process of claim 3 in which the phosphate is dicalcium phosphate.

5. The process of claim 1 in which the alkali metal salt is potassium bromate and the Ca salt is Ca iodate.

6. The process of claim 2 in which the alkali metal salt is potassium bromate and the Ca salt added at the dough making stage is Ca iodate.

7. The process of claim 6 in which dicalcium phosphate is admixed with the dough together with the potassium bromate and Ca iodate.

8. The process of claim 1 in which the amount of Ca salt added is at least 4 parts per million based on the flour.

9. The process of claim 2 in which the amount of Ca salt added is at least about 4 parts per million based on the flour.

10. The process of claim 3 in which the amount of Ca salt added is at least about 4 parts per million based on the flour.

11. The process of claim 6 in which the amount of Ca iodate added is at least about 4 parts per million based on the flour and the maximum total amount of Ca iodate and potassium bromate is about 75 parts per million.

12. The process of claim 7 in which the amount of Ca iodate added is at least about 4 parts per million based on the flour and the maximum total amount of Ca iodate and potassium bromate is about 75 parts per million.

13. A composition for use as a yeast-leavened baked-product improver which comprises a Ca salt selected from the group consisting of iodate, bromate and mixtures thereof, and an alkali metal oxidizing salt selected from the group consisting of iodate, bromate and mixtures thereof, the proportion of alkali metal salt being about one-half to three times the concentration of the Ca salt.

14. The composition of claim 13 which includes in addition a phosphate selected from the group consisting of monocalcium phosphate and dicalcium phosphate.

15. A composition for use as a yeast-leavened baked product improver which comprises Ca iodate and potassium bromate, the proportion of potassium bromate being about one-half to three times the concentration of Ca iodate.

16. A composition for use as a yeast-leavened baked product improver which comprises Ca iodate, potassium bromate and dicalcium phosphate, the proportion of potassium bromate being about one-half to three times the concentration of Ca iodate.

References Cited in the file of this patent

UNITED STATES PATENTS

| | | |
|---|---|---|
| 1,148,329 | Kohman et al. | July 27, 1915 |

FOREIGN PATENTS

| | | |
|---|---|---|
| 741,562 | Great Britain | Dec. 7, 1955 |
| 55,058 | Denmark | July 25, 1938 |

OTHER REFERENCES

Baking Science and Technology, vol. I, 1952, by Pyler, published by Siebel Publishing Co. (Chicago), pp. 372 to 374.